US010177825B2

(12) United States Patent
Maltsev et al.

(10) Patent No.: US 10,177,825 B2
(45) Date of Patent: Jan. 8, 2019

(54) APPARATUS, SYSTEM AND METHOD OF MULTI-INPUT-MULTI-OUTPUT (MIMO) BEAMFORMED COMMUNICATION WITH SPACE BLOCK CODING

(71) Applicant: INTEL CORPORATION, Santa Clara, CA (US)

(72) Inventors: Alexander Alexandrovich Maltsev, Nizhny Novgorod (RU); Andrey Pudeyev, Nizhny Novgorod (RU); Alexei Vladimirovich Davydov, Nizhny Novgorod (RU); Ali S. Sadri, San Diego, CA (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/683,950

(22) Filed: Aug. 23, 2017

(65) Prior Publication Data
US 2018/0123651 A1    May 3, 2018

Related U.S. Application Data

(63) Continuation of application No. 15/272,740, filed on Sep. 22, 2016, now Pat. No. 9,768,841, which is a
(Continued)

(51) Int. Cl.
*H04L 27/00* (2006.01)
*H04B 7/0413* (2017.01)
(Continued)

(52) U.S. Cl.
CPC ........... *H04B 7/0413* (2013.01); *H04B 7/068* (2013.01); *H04B 7/0617* (2013.01);
(Continued)

(58) Field of Classification Search
CPC .. H04B 7/0413; H04B 7/0617; H04B 7/0669; H04B 7/068; H04B 7/0689;
(Continued)

(56) References Cited

U.S. PATENT DOCUMENTS 7,043,275 B2    5/2006    Matsuoka et al.
7,729,333 B2    6/2010    Wang et al.
(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Tesfaldet Bocure
(74) *Attorney, Agent, or Firm* — Shichrur & Co.

(57) ABSTRACT

Some demonstrative embodiments include devices, systems and/or methods of beamformed communication with space block coding. For example, an apparatus may include a controller to control a plurality of antenna subarrays to form a plurality of directional beams directed in a plurality of different directions for communicating a multi-input-multi-output (MIMO) wireless transmission, which is encoded according to a space-block coding scheme.

20 Claims, 5 Drawing Sheets

Related U.S. Application Data continuation of application No. 13/795,073, filed on Mar. 12, 2013, now Pat. No. 9,479,223.

(60) Provisional application No. 61/723,805, filed on Nov. 8, 2012.

(51) Int. Cl.
  *H04B 7/06* (2006.01)
  *H04L 1/06* (2006.01)

(52) U.S. Cl.
  CPC ......... *H04B 7/0669* (2013.01); *H04B 7/0689* (2013.01); *H04B 7/0691* (2013.01); *H04L 1/0606* (2013.01); *H04L 1/0643* (2013.01); *H04L 1/0668* (2013.01)

(58) Field of Classification Search
  CPC ... H04B 7/0691; H04L 1/0606; H04L 1/0643; H04L 1/0668; H04W 72/0413
  See application file for complete search history.

(56) References Cited

U.S. PATENT DOCUMENTS

| | | | |
|---|---|---|---|
| 7,978,781 | B2 | 7/2011 | Zhang et al. |
| 8,248,993 | B2 | 8/2012 | Cai |
| 8,369,450 | B2 | 2/2013 | Khan et al. |
| 8,644,262 | B1 | 2/2014 | Sun et al. |
| 8,644,288 | B2 | 2/2014 | Wang et al. |
| 8,855,228 | B2 | 10/2014 | Zhang et al. |
| 8,855,577 | B2 | 10/2014 | Tang |
| 8,873,484 | B1 | 10/2014 | Lee et al. |
| 8,995,587 | B1 | 3/2015 | Zhang et al. |
| 9,001,879 | B2 | 4/2015 | Maltsev et al. |
| 9,014,045 | B2 | 4/2015 | Ko et al. |
| 9,036,608 | B2 | 5/2015 | Chen et al. |
| 9,479,233 | B2 | 10/2016 | Maltsev et al. |
| 9,531,450 | B2 | 12/2016 | Maltsev et al. |
| 9,768,841 | B2 | 9/2017 | Maltsev et al. |
| 2005/0286462 | A1 | 12/2005 | Roh et al. |
| 2007/0070939 | A1 | 3/2007 | Hottinen |
| 2010/0234040 | A1 | 9/2010 | Palanki et al. |
| 2011/0018767 | A1 | 1/2011 | Maltsev et al. |
| 2011/0134904 | A1 | 6/2011 | Rouquelle-Leveil et al. |
| 2011/0142076 | A1 | 6/2011 | Ko et al. |
| 2012/0002753 | A1 | 1/2012 | Annavajjala et al. |
| 2012/0051294 | A1 | 3/2012 | Guillouard |
| 2012/0275356 | A1 | 11/2012 | Aharony et al. |
| 2013/0121185 | A1 | 5/2013 | Li et al. |
| 2013/0322251 | A1 | 12/2013 | Kotecha et al. |
| 2013/0329839 | A1 | 12/2013 | Kobayashi et al. |
| 2014/0044043 | A1 | 2/2014 | Moshfeghi |
| 2014/0206414 | A1 | 7/2014 | Oh et al. |
| 2014/0301238 | A1 | 10/2014 | Chun et al. |
| 2014/0348271 | A1 | 11/2014 | Ma et al. |
| 2015/0126236 | A1 | 5/2015 | Mukherjee et al. |
| 2015/0195833 | A1 | 7/2015 | Ko et al. |

OTHER PUBLICATIONS

WiGig MAC and PHY Specification Version 1.1. Apr. 2011—Final Specification. pp. 1-442.

U.S. Appl. No. 13/798,852, filed Mar. 13, 2013, 58 pages.

Office Action for U.S. Appl. No. 13/798,852, dated Jun. 10, 2014, 15 pages.

Notice of Allowance for U.S. Appl. No. 15/272,740, dated May 22, 2017, 9 pages.

Office Action for U.S. Appl. No. 13/795,073, dated Aug. 27, 2015, 24 pages.

Final Office Action for U.S. Appl. No. 14/619,293 dated Oct. 16, 2015, 17 pages.

Office Action for U.S. Appl. No. 14/619,293 dated May 13, 2015, 16 pages.

Office Action for U.S. Appl. No. 13/795,073 dated Feb. 12, 2016, 19 pages.

Office Action for U.S. Appl. No. 14/619,293, dated Feb. 24, 2016, 17 pages.

Notice of Allowance for U.S. Appl. No. 14/619,293, dated Aug. 10, 2016, 12 pages.

Office Action for U.S. Appl. No. 15/272,740, dated Feb. 8, 2017, 26 pages.

Office Action for U.S. Appl. No. 13/798,852, dated Aug. 25, 2014, 12 pages.

Jie Wang et al., "A Comparison of Reception Schemes for Interference Suppression in MIMO-OSTBCs System," 2009, IEEE, PPO 5-9, 2009, 5 pages.

APPARATUS, SYSTEM AND METHOD OF MULTI-INPUT-MULTI-OUTPUT (MIMO) BEAMFORMED COMMUNICATION WITH SPACE BLOCK CODING

CROSS REFERENCE

This Application is a Continuation of U.S. patent application Ser. No. 15/272,740 entitled "Apparatus, System, and Method of Multi-Input-Multi-Output (MIMO) Beamformed Communication with Space Block Coding", filed Sep. 22, 2016, now U.S. Pat. No. 9,768,841, which is a Continuation of U.S. patent application Ser. No. 13/795,073 entitled "Apparatus, System, and Method of Multi-Input-Multi-Output (MIMO) Beamformed Communication with Space Block Coding", filed Mar. 12, 2013, now U.S. Pat. No. 9,479,233, which claims the benefit of and priority from U.S. Provisional Patent Application No. 61/723,805 entitled "Apparatus, System and Method of Multi-Input-Multi-Output (MIMO) Beamformed Communication with Space Block Coding", filed Nov. 8, 2012, the entire disclosures of which are incorporated herein by reference.

TECHNICAL FIELD

Embodiments described herein generally relate to Multi-Input-Multi-Output (MIMO) beamformed communication with space block coding.

BACKGROUND

Some wireless communication systems may communicate over the Millimeter wave (mmWave) frequency band, e.g., the 60 GHz Frequency band. A mmWave propagation has a few major distinctive features in comparison with lower frequency bands, e.g., the frequency bands of 2.4-5 GHz. For example, the mmWave propagation may have a propagation loss higher than the lower frequency bands, and may have Quasi-optical propagation properties.

A mmWave communication system may use high-gain directional antennas to compensate for large path loss and/or employ beam-steering techniques to select a highest quality link for data transmission. Design of appropriate antenna system and/or further signal processing may be an important aspect of mmWave communication system development.

Multi-element phased antenna arrays may be used, for example, for creation of a directional antenna pattern. A phased antenna array may form a directive antenna pattern or a beam, which may be steered by setting appropriate signal phases at the antenna elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications*, Mar. 29, 2012; *IEEE*802.11 *task group ac* (*TGac*) ("*IEEE*802.11-09/0308r12—*TGac Channel Model Addendum Document*"); *IEEE* 802.11 *task group ad* (*TGad*) (*IEEE P*802.11*ad Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The term "beamforming", as used herein, may relate to a spatial filtering mechanism, which may be used at a transmitter and/or a receiver to improve the received signal power or signal-to-noise ratio (SNR) at an intended receiver.

Figure 1:
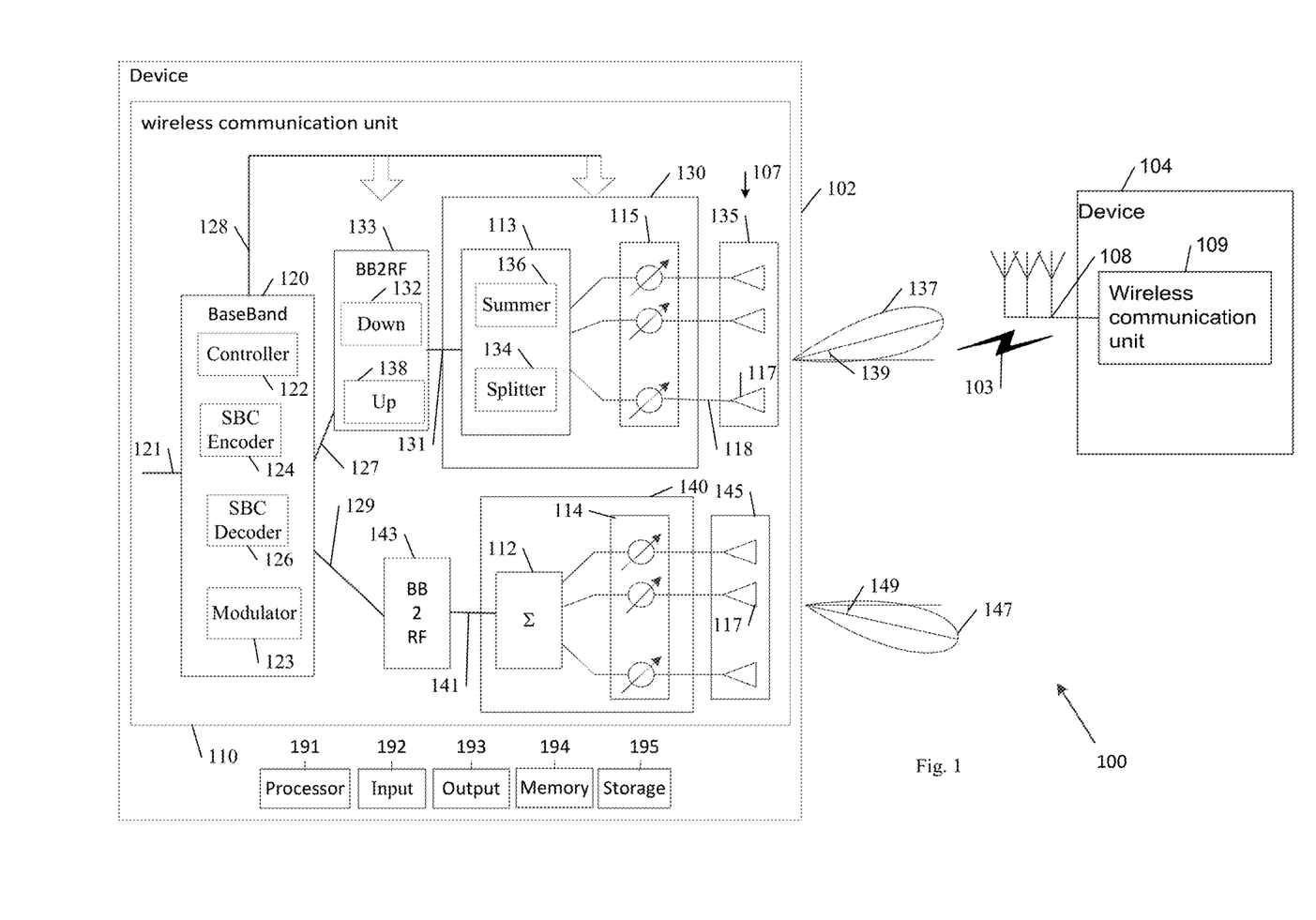
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102 and/or 104, capable of communicating content, data, information and/or signals over a wireless communication link, for example, over a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include a wireless communication unit capable of communicating content, data, information and/or signals over at least one wireless communication link 103. For example, device 102 may include a wireless communication unit 110 and device 104 may include a wireless communication unit 109.

In some demonstrative embodiments, wireless communication units 110 and/or 109 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

Devices 102 and/or 104 may also include, for example, one or more of a processor 191, an input unit 192, an output unit 193, a memory unit 194, and a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may include, or may be included as part of a mobile or portable device, for example, a Smartphone, a mobile phone, a mobile computer, a laptop computer, a notebook computer, a tablet computer, a handheld computer, a handheld device, a PDA device, a handheld PDA device, an on-board device, an off-board device, a hybrid device, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, an UMD, an UMPC, an MID, an "Origami" device or computing device, a device that supports DCC, a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a music player, or the like.

In some demonstrative embodiments device 104 may include, or may be included as part of a mobile device or as part of a non-mobile device, for example, a wireless router, an access point (AP), a personal computer (PC), a docking device, and/or the like.

In some demonstrative embodiments, wireless communication link 103 may include a direct link, e.g., a P2P link, for example, to enable direct communication between devices 102 and 104.

In some demonstrative embodiments, wireless communication link 103 may include a wireless communication link over the DMG band.

In some demonstrative embodiments, wireless communication devices 102 and/or 104 may perform the functionality of DMG stations ("DMG STA"). For example, wireless communication devices 102 and/or 104 may be configured to communicate over the DMG band.

In some demonstrative embodiments, wireless communication link 103 may include a wireless beamformed link.

In some demonstrative embodiments, wireless communication link 103 may include a wireless gigabit (WiGig) link. For example, wireless communication link 103 may include a wireless beamformed link over the 60 GHZ frequency band.

In other embodiments, wireless communication link 103 may include any other suitable link and/or may utilize any other suitable wireless communication technology.

In some demonstrative embodiments, antennas 107 may include at least one antenna array including a plurality of antenna elements 117. The plurality of antenna elements 117 may be configured, for example, for creation of a highly-directional antenna pattern. The plurality of antenna elements 117 may include, for example, about 16-36 antenna elements, or any other number of antenna elements, which may be placed in a predefined geometry. The plurality of antenna elements 117 may be configured to form a highly directive antenna pattern or a beam, which may be steered by setting appropriate signal phases at antenna elements 117, e.g., as described below.

In some demonstrative embodiments, antennas 107 may include a plurality of antenna subarrays. For example, antennas 107 may include a first antenna subarray 135, and a second antenna subarray 145. In other embodiments, antennas 107 may include any other number of antenna subarrays, e.g., more than two antenna subarrays.

The phrase "antenna subarray" as used herein may relate to a group of antenna elements of the plurality of antenna elements 117, which may be connected, for example, to a common RF chain. In one example, antennas 107 may include an antenna array, which may be divided into a plurality of, e.g., independent subarrays, each capable of independently generating a directional beam. In another example, antennas 107 may include a plurality of different antenna arrays to generate a plurality of directional beams. In another example, antennas 107 may include two or more different antenna arrays. One or more of the different antenna arrays may be divided into two or more subarrays.

In some demonstrative embodiments, first antenna subarray 135 may include a first plurality of antenna elements of the plurality of antenna elements 117 configured to form a first directional beam 137 directed in a first direction 139.

In some demonstrative embodiments, second antenna subarray 145 may include a second, e.g., different, plurality of antenna elements of the plurality of antenna elements 117 configured to form a second directional beam 147 directed in a second direction 149.

In some demonstrative embodiments, wireless communication unit 110 may include a plurality of Radio Frequency (RF) chains configured to control the first and second pluralities of antenna elements of antenna subarrays 135 and 145.

In some demonstrative embodiments, the plurality of Radio Frequency (RF) chains may be connected to the plurality of antenna subarrays. For example, wireless communication unit 110 may include a first RF chain 130 connected to first antenna subarray 135, and a second RF chain 140 connected to second antenna subarray 145. In other embodiments, wireless communication unit 110 may include any other number of RF chains connected to any other number of the plurality of antenna subarrays, e.g., more than two RF chains connected to more than two antenna subarrays.

In some demonstrative embodiments, RF chains 130 and/or 140 may include or may be included as part of a radio frequency integrated circuit (RFIC), which may be connected to antenna subarrays 135 and 145 through a plurality of feed lines 118, which may be, for example, micro-strip feed lines.

In some demonstrative embodiments, the plurality of RF chains may enable processing, e.g., simultaneous processing, of two or more independent RF signals, e.g., carrying different data. For example, RF chain 130 may process an RF signal 131, and RF chain 140 may process an RF signal 141.

In some demonstrative embodiments, RF chain 130 may include a plurality of phase shifters 115 configured to adjust the phases of the antenna elements of antenna subarray 135. For example, a phase shifter of phase shifters 115 may be configured to adjust a corresponding antenna element of antenna subarray 135.

For example, phases of the antenna elements of antenna subarrays 135 may be shifted, e.g., by phase shifters 115, to provide a constructive and/or destructive interference, configured to change the beamforming scheme of antenna subarray 135 and to change the direction of directional beam 137.

In some demonstrative embodiments, RF chain 140 may include a plurality of phase shifters 114 configured to adjust the phases of the antenna elements of antenna subarray 145. For example, a phase shifter of phase shifters 114 may be configured to adjust a corresponding antenna element of antenna subarray 145.

For example, phases of the antenna elements of antenna subarrays 145 may be shifted, e.g., by phase shifters 114, to provide a constructive and/or destructive interference, configured to change the beamforming scheme of antenna subarray 145 and to change the direction of directional beam 147.

Phase shifters 115 and/or 114 may be discrete, e.g., configured to rotate the phase of the antenna elements of antenna subarrays 135 and/or 145 to a limited set of values, for example, 0, ±π/2, and π, allowing only a relatively coarse beamforming for changing a direction of directional beams 137 and/or 147.

In some demonstrative embodiments, RF chain 130 may include a summer/splitter block 113 connected to phase shifters 115 and/or RF chain 140 may include a summer/splitter block 112 connected to phase shifters 114.

In some demonstrative embodiments, summer/splitter block 113 may include a splitter 134, e.g., a multiplexer, configured to reproduce and split RF signal 131 between the antenna elements of antenna subarray 135 and to couple the reproduced signals of RF signal 131 to phase shifters 115, e.g., when transmitting RF signal 131.

In some demonstrative embodiments, summer/splitter block 113 may include a summer 136 configured to sum into RF signal 131 signals received from the antenna elements of antenna subarray 135, e.g., when receiving RF signal 131.

In some demonstrative embodiments, utilizing two or more RF chains may enable baseband processing, e.g., simultaneously, of two or more independent signals, e.g., carrying different data, communicated via two or more directional beams. In contrast, utilizing a single RF chain may enable baseband processing of only one signal, e.g., even if a large number of antenna elements 117 are utilized.

For example, RF chains 130 and 140 may enable baseband processing, e.g., independent baseband processing, of RF signals 131 and 141 communicated via directional beams 137 and 147.

In some demonstrative embodiments, wireless communication unit 110 may utilize the two or more RF chains to perform MIMO beamformed communication, e.g., as described below.

In some demonstrative embodiments, wireless communication unit 110 may include a baseband 120 configured to control antenna subarrays 135 and 145 to form directional beams 137 and 147 directed to directions 139 and 149 for communicating a MIMO wireless transmission.

In some demonstrative embodiments, baseband 120 may process a data stream 121 into the MIMO wireless transmission to be communicated utilizing a MIMO beamformed scheme, e.g., as described below.

Some demonstrative embodiments are described herein with reference to a wireless communication unit, e.g., wireless communication unit 110, configured to perform both transmission and reception of a MIMO beamformed communication. Other embodiments may include a wireless communication unit capable of performing only one of transmission and reception of a MIMO beamformed communication.

In some demonstrative embodiments, wireless communication unit 110 may include a plurality of base-band (BB) to RF (BB2RF) converters interfacing between the plurality of RF chains and baseband 120. For example, wireless communication unit 110 may include BB2RF converters 133 connecting between RF chain 130 and base-band 120, and BB2RF converters 143 connecting between RF chain 140 and base-band 120. In other embodiments, wireless communication unit 110 may include any other number of BB2RF converters connecting between baseband 120 and any other number of RF chains, e.g., more than two.

In some demonstrative embodiments, BB2RF converter 133 may convert RF signal 131 into baseband data signal 127 and vice versa, and/or BB2RF converters 143 may convert RF signal 141 into baseband data signal 129 and vice versa.

In one example, BB2RF converter 133 may convert RF signal 131 into baseband data signal 127, and/or BB2RF converter 143 may convert RF signal 141 into baseband data signal 129, e.g., if wireless communication unit 110 receives the MIMO wireless transmission.

In another example, BB2RF converter 133 may convert baseband data signal 127 into RF signal 131 and/or BB2RF converter 143 may convert baseband data signal 129 into RF signal 141, e.g., if wireless communication unit 110 transmits the MIMO wireless transmission.

In some demonstrative embodiments, BB2RF converters 133 and/or 143 may include down-converters, configured to convert an RF signal into a baseband data signal, and to provide the baseband data signal to baseband 120, e.g., if wireless communication unit 110 receives the MIMO wireless transmission.

For example, RF chain 130 may include a down converter 132 configured to down-convert RF signal 131 into data signal 127, and to provide data signal 127 to baseband 120.

In some demonstrative embodiments, base-band to RF converters 133 and/or 143 may include up-converters, configured to convert a baseband data signal into an RF signal and to provide the RF signal to an RF chain, e.g., if wireless communication unit 110 transmits the MIMO wireless transmission.

For example, RF chain 130 may include an up-converter 138 configured to up-convert data signal 127 into RF signal 131 and to provide RF signal 131 to RF chain 130.

In some demonstrative embodiments, wireless communication unit 110 may be utilized by a Transmit (TX) side and a Receive (RX) side to form a plurality of independent directional communication beams between the TX and RX sides. Accordingly, the plurality of directional beams may be utilized for using a plurality of independent paths for communicating, e.g., simultaneously, a plurality of data streams, e.g., different data streams, thus increasing total throughput.

In some demonstrative embodiments, a plurality of different signals may be communicated via a plurality of beamformed links formed by the plurality of beamformed beams, e.g., simultaneously. Each beamformed link, which corresponds to an antenna subarray of the plurality of antenna subarrays, may communicate a signal, for example, via a plurality of antenna elements of the antenna subarray.

For example, a first signal, e.g., signal 127, may be communicated via a first beamformed link formed by directional beam 137 generated by antenna subarray 135, and a second, e.g., different signal, for example, signal 129, may be communicated via a second beamformed link formed by directional beam 147 generated by antenna subarray 145. The signals 127 and 129 may be communicated via directional beams 137 and 147, e.g., simultaneously.

In some demonstrative embodiments, wireless communication unit 110 may be configured to perform hybrid beamforming. The hybrid beamforming may include, for example, performing a coarse beamforming in RF chains 130 and/or 140; and fine beamforming in baseband 120, e.g., as described below.

In one example, the coarse beamforming may be performed between devices 102 and 104. For example, during the coarse beamforming, device 102 may steer directional beams 137 and/or 147 to a plurality of directions, e.g., which may deliver a maximal RX signal power and/or according to any other criteria; and device 104 may have a fixed quasi-omni antenna pattern of antennas 108 to receive the transmissions from device 102. Alternatively, device 104 may adjust antennas 108 to maximize the received RX signal power, e.g., by performing a sector level sweep.

A closed-loop MIMO system may have a drawback in the necessity of channel state information feedback from the RX side to TX side, which creates overhead and reduces total system throughput. Due to latency, the channel state information cannot be always up to date in a non-stationary environment, for example, a fast changing environment, e.g., in a scenario of "human blockage", which further affects the throughput.

In some demonstrative embodiments, wireless communication unit 110 may be configured to communicate according to a Coarse-Beamforming Space-Block-Coding (CB-SBC) scheme. The CB-SBC scheme may include performing a coarse beamforming in RF chains 130 and/or 140, e.g., using phase-shifters 139 and/or 149; and fine beamforming with space-block coding in baseband 120, e.g., using MIMO processing at base-band 120.

In some demonstrative embodiments, at least some of the differences between the CB-SBC scheme and a closed loop MIMO scheme may be summarized, e.g., as follows:

TABLE 1

|  | CB-SBC | Closed-Loop MIMO |
|---|---|---|
| Modulation | May be used with Single-Carrier and/or OFDM | OFDM only |
| Feedback type | Modulation-coding scheme (MCS), obtained once after the initial sector scan and link establishment. Reduced overhead | Frequent Beam Refinement scans are required to keep the TX channel knowledge up to date. Increased overhead |
| Advantages | Robust against blockage | High throughput |

In some demonstrative embodiments, wireless communication unit 110 may include a baseband controller 122 configured to control the coarse beamforming and the fine beamforming according to the CB-SBC scheme, e.g., as described below.

In some demonstrative embodiments, base-band controller 122 may be configured to control the plurality of antenna subarrays to form the plurality of directional beams directed in the plurality of different directions for communicating the MIMO wireless transmission.

For example, controller 122 may control antenna subarray 135 to form directional beam 137 directed in direction 139, and antenna subarray 145 to form directional beam 147 directed in direction 149, for communicating the MIMO wireless transmission via beams 137 and 147.

In some demonstrative embodiments, controller 122 may control antenna subarrays 135 and/or 145 utilizing a control signal 128 carrying the amount of phase shift to be applied to one or more phase shifters of phase shifters 115 and/or 114.

In some demonstrative embodiments, the phase shift adjustments to phase shifters 115 may determine and/or control the beam width, gain and/or direction of directional beam 137 formed by antenna subarray 135.

In some demonstrative embodiments, the phase shift adjustments to phase shifters 114 may determine and/or control the beam width, gain and/or direction of directional beam 147 forms by antenna subarray 145.

In some demonstrative embodiments, each phase shifter of an antenna element of antenna subarrays 135 and/or 145 may perform a local phase adjustment to a signal to create a local phase distribution in a desired beam direction.

In some demonstrative embodiments, control signal 128 may include weighting coefficients, which may be generated and/or derived from controller 122, configured to steer directional beams 137 and/or 147.

In some demonstrative embodiments, controller 122 may provide via control signal 128 a first set of weighting coefficients to phase shifters 139 configured to form a local phase adjustment to one or more antenna elements of antenna subarray 135, resulting in directing beam 137 to direction 139.

In some demonstrative embodiments, controller 122 may provide via control signal 128 a second, e.g., different set of weighting coefficients, to phase shifters 149 configured to form a local phase adjustment to one or more antenna elements of antenna subarray 145, resulting in directing beam 147 to direction 149.

In some demonstrative embodiments, baseband 120 may perform the fine beamforming utilizing a space-block coding scheme.

In some demonstrative embodiments, baseband 120 may process the MIMO wireless transmission according to the space-block coding scheme, e.g., as described in detail below.

In some demonstrative embodiments, baseband 120 may utilize the space-block coding scheme including a space-time-block-coding (STBC) scheme.

In some demonstrative embodiments, any suitable STBC scheme may be used, e.g., Alamouti code, Turbo code, and the like.

In some demonstrative embodiments, baseband 120 may utilize the space-block coding scheme including a space-frequency-block-coding (SFBC) scheme.

In some demonstrative embodiments, base-band 120 may include a modulator 123 configured to modulate the MIMO wireless transmission according to a modulation scheme.

In some demonstrative embodiments, modulator 123 may modulate the MIMO wireless transmission according to a single-carrier (SC) modulation scheme.

In some demonstrative embodiments, modulator 123 may modulate the MIMO wireless transmission according to a multi-carrier modulation scheme, e.g., OFDM.

In some demonstrative embodiments, the STBC scheme may be utilized, for example, for wireless communication systems capable of handling both single-carrier and OFDM.

In some demonstrative embodiments, the SFBC scheme may be utilized, for example, for wireless communication systems capable of handling only the multicarrier scheme, e.g., OFDM.

In some demonstrative embodiments, wireless communication unit 110 may be utilized to perform the functionality of the TX side, e.g., device 104 may perform the functionality of the Rx side. For example, wireless communication unit 110 may transmit the MIMO wireless transmission, e.g., as described in detail below.

In some demonstrative embodiments, baseband 120 may include an SBC encoder 124 configured to perform the fine beamforming by encoding data stream 121 into data signals 127 and/or 129 according to the SBC scheme.

In one example, SBC encoder 124 may include an STBC encoder configured to encode data stream 121 into data signals 127 and/or 129 according to the STBC scheme. For example, encoder 124 may encode data symbols of data stream 121 into data symbols of signals 127 and/or 129 to be transmitted, e.g., simultaneously, via directional beams 137 and/or 147, e.g., as described below with reference to FIG. 2.

Figure 2:
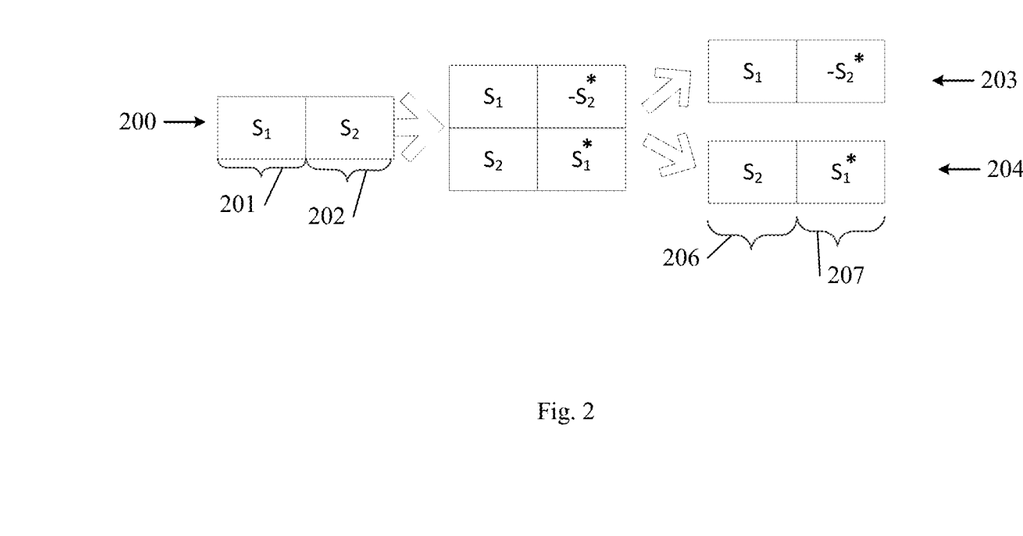
FIG. 2 is a schematic illustration of a space-time coding scheme, in accordance with some demonstrative embodiments.

Reference is made to FIG. 2, which schematically illustrates a space-time coding scheme, in accordance with some demonstrative embodiments. For example, encoder 124 (FIG. 1) may utilize the space-time coding scheme of FIG. 2 to encode a data stream 200, e.g., data stream 121 (FIG. 1).

In some demonstrative embodiments, the space-time coding scheme may include an Alamouti coding scheme.

As shown in FIG. 2, data stream 200 may include a stream of data symbols, e.g., modulated data symbols, which may be modulated according to a SC scheme or an OFDM scheme.

As shown in FIG. 2, data stream 200 may include a first time slot 201 including a first symbol, denoted $S_1$, of the data symbols; and a second time slot 202, e.g., immediately successive to time slot 201, including a second symbol, denoted $S_2$, of the data symbols.

As shown in FIG. 2, encoder 124 (FIG. 1) may encode data stream 200 into two encoded data streams 203 and 204 configured to be transmitted utilizing the MIMO beamformed transmission. For example, data stream 203 may be transmitted via antenna subarray 135 (FIG. 1) and data stream 204 may be transmitted via antenna subarray 145 (FIG. 1), e.g., simultaneously.

In some demonstrative embodiments, data signal 127 (FIG. 1) may include data stream 203, and data signal 129 (FIG. 1) may include data stream 204.

As shown in FIG. 2, encoder 124 (FIG. 1) may encode data stream 200 into two encoded data streams 203 and 204 according to the Alamouti coding scheme.

As shown in FIG. 2, encoder 124 (FIG. 1) may encode the first symbol $S_1$ of data stream 200 into symbol $S_1$ within a first time slot 206 of encoded data stream 203, and into symbol $S_1^*$ within a second time slot 207, e.g., immediately successive to first time slot 206, of data stream 204, wherein $S_1^*$ denotes a complex conjugate of the first symbol $S_1$.

As shown in FIG. 2, encoder 124 (FIG. 1) may encode the second symbol $S_2$ of data stream 200 into symbol $S_2$ within time slot 206 of encoded data stream 204, and into symbol $-S_2^*$ within time slot 207 of data stream 203, wherein $S_2^*$ denotes a complex conjugate of the first symbol $S_2$.

In some demonstrative embodiments, controller 122 (FIG. 1) may control antenna subarrays 135 (FIG. 1) and 145 (FIG. 1) to simultaneously transmit symbol $S_1$ and symbol $S_2$ within time slot 206, and to simultaneously transmit symbol $S_2^*$ and symbol $S_1^*$ within time slot 207.

Referring back to FIG. 1, in another example, SBC encoder 124 may include an SFBC encoder configured to encode data stream 121 into data signals 127 and/or 129 according to the SFBC scheme. Data signals 127 and/or 129 may represent data stream 121 according to the SFBC scheme to be transmitted via directional beams 137 and/or 147. For example, encoder 124 may encode data symbols of data stream 121 into data symbols of signals 127 and/or 129 to be transmitted via directional beam 137 utilizing a first frequency and/or via directional beams 147 utilizing a second, e.g., different, frequency.

In some demonstrative embodiments, BB2RF converter 133 may up-convert data signal 127 into RF signal 131 and may provide RF signal 131 to RF chain 130, and/or BB2RF converter 143 may up-convert data signal 129 into RF signal 141, and may provide RF signal 141 to RF chain 140.

In some demonstrative embodiments, RF chain 130 may reproduce RF signal 131 to the antenna elements of antenna subarrays 135, and/or RF chain 140 may reproduce RF signal 141 to the antenna elements of antenna subarray 145.

In some demonstrative embodiments, controller 120 may perform the coarse beamforming by shifting phases of phase shifters 115 of antenna subarray 135, e.g., utilizing control signal 128, to form directional beam 137, and to transmit RF signal 131 via directional beam 137; and/or by shifting phases of phase shifters 114 of antenna subarrays 145, e.g., utilizing control signal 128, to form directional beam 147, and to transmit RF signal 141 via directional beam 147.

In some demonstrative embodiments, wireless communication unit 110 may be utilized to perform the functionality of the RX side, e.g., device 104 may perform the functionality of the TX side. For example, wireless communication unit 110 may receive the MIMO wireless transmission according to the CB-SBC scheme, e.g., as described in detail below.

In some demonstrative embodiments, controller 120 may control antenna subarray 135 to form directional beam 137 and/or antenna subarray 145 to form directional beam 147 for receiving the MIMO wireless transmission.

In some demonstrative embodiments, summer 136 may sum received signals from antenna subarray 135 representing the MIMO wireless transmission, and may provide RF signal 131 to BB2RF converters 133.

In some demonstrative embodiments, summer block 112 may sum received signals from antenna subarray 145 representing the MIMO wireless transmission and may provide RF signal 141 to BB2RF converter 143.

In some demonstrative embodiments, BB2RF converter 133 may down-convert RF signal 131 into data signal 127, and may provide data signal 127 to baseband 120; and/or BB2RF converter 143 may down-convert RF signal 141 into data signal 129, and may provide data signal 129 to baseband 120.

In some demonstrative embodiments, baseband 120 may receive data signals 127 and/or 129 and may perform the fine beamforming by processing RF signals 127 and/or 129 according to the SBC scheme.

In some demonstrative embodiments, baseband 120 may include an SBC decoder 126 configured to decode the signals 127 and/or 129 into data stream 121 according to the SBC scheme. For example, decoder 126 may include a Zero Force (ZF) decoder to decode data signals 127 and 129.

In some demonstrative embodiments, performing the CB-SBC including the coarse RF beamforming and the fine RF beamforming may provide a high level of robustness.

In one example, blockage of one of directional beams 137 and/or 147 may not interrupt the transmission, e.g., if utilizing the CB-SBC scheme.

In some demonstrative embodiments, controller 122 may be configured to adaptively select between at least two communication modes for processing the MIMO wireless transmission.

In some demonstrative embodiments, controller 122 may be configured to select between the space-block coding scheme and an open-loop MIMO scheme for processing the MIMO wireless transmission. For example, controller 122 may be configured to select between using the space-block coding scheme and using the open-loop MIMO scheme, e.g., based on a throughput criterion, as described below.

In some demonstrative embodiments, the Open Loop MIMO scheme may be efficient, for example, in areas having high-SNR, and/or the SBC scheme may be efficient, for example, in areas having low-SNR.

In some demonstrative embodiments, controller 122 may select between using the SBC scheme or the open-loop MIMO scheme for processing the MIMO wireless transmission in baseband 120.

In one example, controller 122 may select between using the SBC scheme or the open-loop MIMO scheme for processing the MIMO wireless transmission in baseband 120 based on a predefined throughput maximization criterion. For example, controller 122 may select a scheme providing a maximal throughput, e.g., in terms of data rate. For example, potential data rates for the MIMO transmission using the SBC and open-loop MIMO schemes may be calculated, e.g., based of channel state information. A modulation and coding scheme (MCS) may be selected from a set of MCSs corresponding to the SBC and open-loop MIMO schemes, such that the selected MCS may provide a maximal data rate (throughput) for a target Packet Error Rate (PER) level, e.g. 10%. In other embodiments, any other criteria may be used for selecting between the SBC scheme and the open-loop MIMO scheme.

In some demonstrative embodiments, the adaptive selection between the SBC and OL-MIMO schemes may provide improved performance, e.g., in realistic changing environments, for example, as a result of blocking, e.g., human blockage of directional beams 137 and/or 147.

Figure 3:
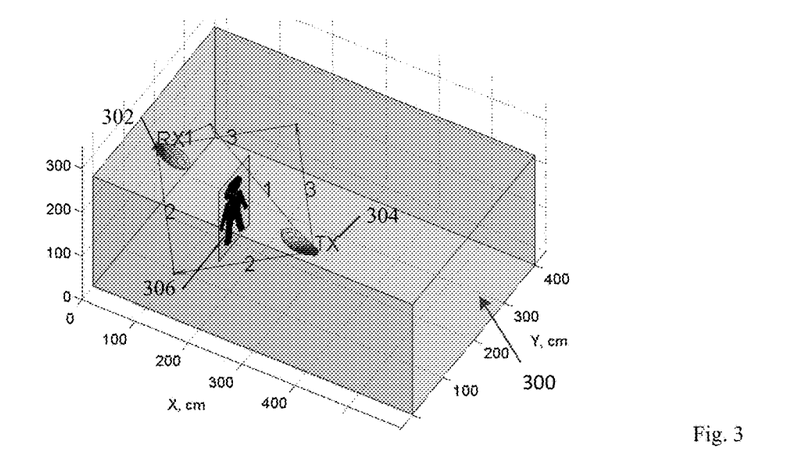
FIG. 3 is a schematic illustration of a simulation environment for simulating a performance of a Multi-Input-Multi-Output (MIMO) transceiver, in accordance with some demonstrative embodiments.

Reference is made to FIG. 3, which schematically illustrates a simulation environment 300 for simulating the performance of a MIMO transceiver, in accordance with some demonstrative embodiments. For example, the MIMO transceiver may perform the functionality of wireless communication unit 110 (FIG. 1).

As Shown in FIG. 3, environment 300 may simulate a receiver (RX) 302, e.g., a Television (TV) receiver, positioned on a wall of a room, and transmitter (TX) 304, e.g., a video player, positioned in the room.

As shown in FIG. 3 there may be at least three communication paths, denoted "1", "2", and "3" between receiver 302 and transmitter 304.

As shown in FIG. 1, a human 306 may block a direct path, e.g., the path "1", from transmitter 304 to receiver 302.

In some demonstrative embodiments, simulation environment 300 may be utilized for calculating an SNR/Throughput distribution in environment 300 and TX/RX setup.

Figure 4A:
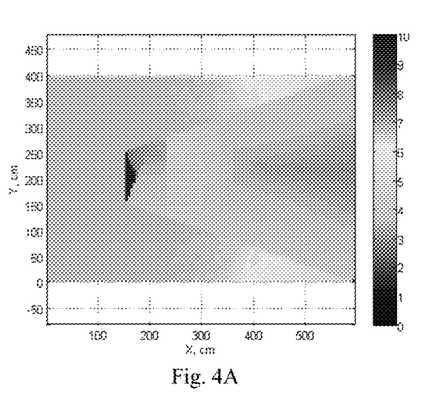
FIGS. 4A, 4B and 4C are simulation results of Signal to Noise Ratio (SNR) throughput distribution, in accordance with some demonstrative embodiments.
Figure 4B:
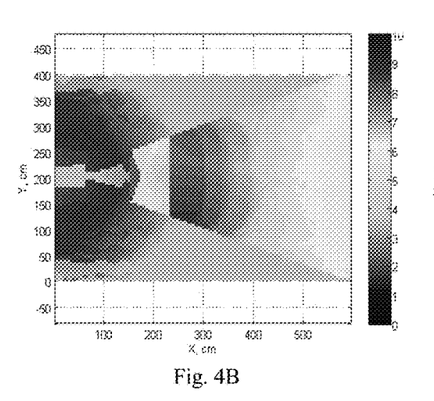
Figure 4C:
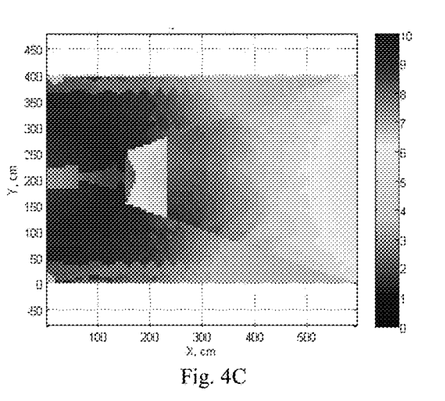

Reference is made to FIGS. 4A, 4B and 4C, which schematically illustrate simulation results of SNR/Throughput distribution, in accordance with some demonstrative embodiment.

FIG. 4A. illustrates simulation results of SNR/Throughput distribution with respect to a conventional WiGig system supporting a single ray, for example, a system including two wireless communication devices utilizing a single RF chain.

FIG. 4B illustrates simulation results of SNR/Throughput distribution with respect to a MIMO transceiver utilizing the selection between the SBC scheme and OL-MIMO scheme, in accordance with some demonstrative embodiments. For example, the MIMO transceiver may perform the functionality of wireless communication unit 110 (FIG. 1).

FIG. 4C illustrates simulation results of SNR/Throughput distribution with respect to a transceiver utilizing closed-loop (CL)-MIMO.

As shown in FIGS. 4A-4C, the performance of the MIMO transceiver utilizing the SBC scheme may be comparable to the performance of the CL-MIMO scheme and may significantly outperform the conventional WiGig system.

Figure 5:
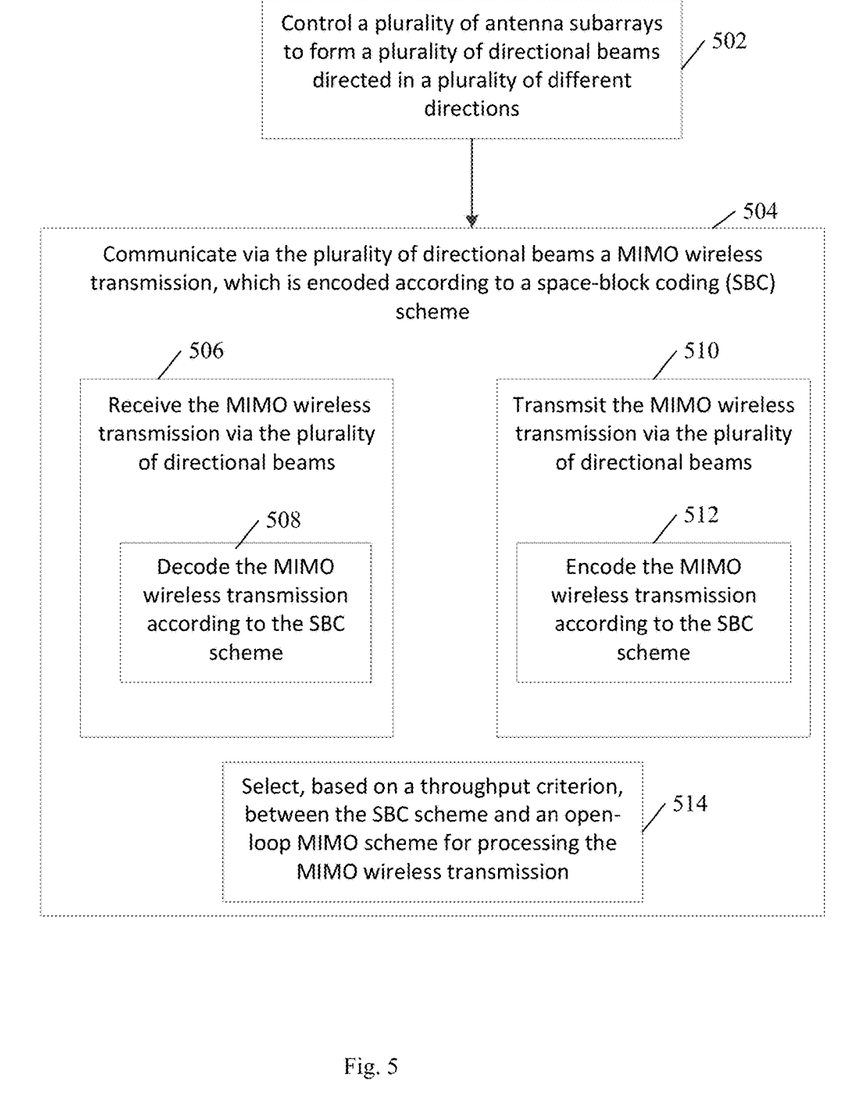
FIG. 5 is a schematic flow-chart illustration of a method of MIMO beamformed communication with space block coding, in accordance with some demonstrative embodiments.

Reference is made to FIG. 5, which schematically illustrates a method of MIMO beamformed communication with space block coding, in accordance with some demonstrative embodiments. In some embodiments, one or more of the operations of the method of FIG. 5 may be performed by a wireless communication system, e.g., system 100 (FIG. 1); a wireless communication device, e.g., device 102 (FIG. 1); a baseband, e.g., baseband 120 (FIG. 1); a controller, e.g., controller 122 (FIG. 1), and/or a wireless communication unit, e.g., wireless communication units 110 and or 109 (FIG. 1).

As indicated at block 502, the method may include controlling a plurality of antenna subarrays to form a plurality of directional beams directed in a plurality of different directions. For example, controller 122 (FIG. 1) may control antenna subarrays 135 (FIG. 1) and 145 (FIG. 1) to form directional beams 137 (FIG. 1) and 147 (FIG. 1) directed in directions 139 (FIG. 1) and 149 (FIG. 1), e.g., as described above.

As indicated at block 504, the method may include communicating via the plurality of directional beams a multi-input-multi-output (MIMO) wireless transmission, which is encoded according to a space-block coding scheme. For example, wireless communication unit 110 (FIG. 1) may communicate via directional beams 137 (FIG. 1) and 147 (FIG. 1) the MIMO wireless transmission, which is encoded according to a space-block coding scheme, e.g., as described above.

As indicated at block 506, communicating via the plurality of directional beams may include receiving the MIMO wireless transmission via the plurality of directional beams. For example, wireless communication unit 110 (FIG. 1) may receive the MIMO wireless transmission via directional beams 137 (FIG. 1) and 147 (FIG. 1), e.g., as described above.

As indicated at block 508, receiving the MIMO wireless transmission may include decoding the MIMO wireless transmission according to the space-block coding scheme. For example, decoder 126 (FIG. 1) may decode the MIMO wireless transmission according to the space-block coding scheme, e.g., as described above.

As indicated at block 510, communicating via the plurality of directional beams may include transmitting the MIMO wireless transmission via the plurality of directional beams. For example, wireless communication unit 110 (FIG. 1) may transmit the MIMO wireless transmission via directional beams 137 (FIG. 1) and 147 (FIG. 1), e.g., as described above.

As indicated at block 512, transmitting the MIMO wireless transmission may include encoding the MIMO wireless transmission according to the space-block coding scheme. For example, encoder 124 (FIG. 1) may encode the MIMO wireless transmission according to the space-block coding scheme, e.g., as described above.

As indicated at block 514, communicating via the plurality of directional beams may include selecting, based on a throughput criterion, between the space-block coding scheme and an open-loop MIMO scheme for processing the MIMO wireless transmission, For example, controller 122 (FIG. 1) may select, based on a throughput criterion, between the space-block coding scheme and the open-loop MIMO scheme for processing the MIMO wireless transmission, e.g., as described above.

Figure 6:
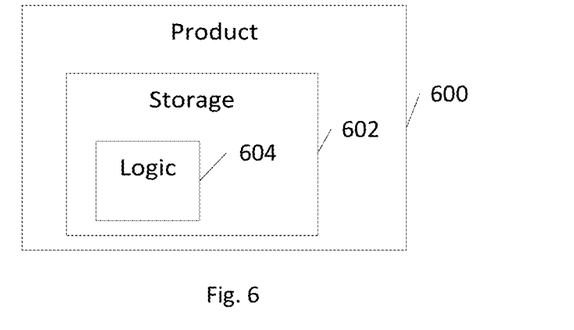
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), device 104 (FIG. 1), wireless communication unit 110 (FIG. 1), wireless communication unit 109 (FIG. 1), and/or controller 122 (FIG. 1) and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 is an apparatus of wireless communication, the apparatus comprising a controller to control a plurality of antenna subarrays to form a plurality of directional beams directed in a plurality of different directions for communicating a multi-input-multi-output (MIMO) wireless transmission, which is encoded according to a space-block coding scheme.

Example 2 includes the subject matter of Example 1 and optionally, wherein the controller is to control the plurality of antenna subarrays to form the plurality of beams for receiving the MIMO wireless transmission, the apparatus comprising a space-block decoder to decode the MIMO wireless transmission.

Example 3 includes the subject matter of Example 1 or Example 2 and optionally, wherein the controller is to control the plurality of antenna subarrays to form the plurality of beams for transmitting the MIMO wireless transmission, the apparatus comprising a space-block encoder to encode the MIMO wireless transmission.

Example 4 includes the subject matter of any one of Examples 1-3 and optionally, wherein the controller is to select between the space-block coding scheme and an open-loop MIMO scheme for processing the MIMO wireless transmission.

Example 5 includes the subject matter of Example 4 and optionally, wherein the controller is to select between the space-block coding scheme and the open-loop MIMO scheme based on a throughput criterion.

Example 6 includes the subject matter of any one of Examples 1-5 and optionally, wherein the space-block coding scheme comprises a space-time-block-coding (STBC) scheme.

Example 7 includes the subject matter of any one of Examples 1-5 and optionally, wherein the space-block coding scheme comprises a space-frequency-block-coding (SFBC) scheme.

Example 8 includes the subject matter of any one of Examples 1-7 and optionally, wherein the wireless transmission is modulated according to a single-carrier modulation scheme.

Example 9 includes the subject matter of any one of Examples 1-7 and optionally, wherein the wireless transmission is modulated according to a multi-carrier modulation scheme.

Example 10 includes the subject matter of any one of Examples 1-9 and optionally, wherein the MIMO wireless transmission comprises a transmission over a directional multi-gigabit (DMG) channel.

Example 11 include a system of wireless communication, the system comprising at least one wireless communication device to perform multi-input-multi-output (MIMO) communication, the wireless communication device including a plurality of antenna subarrays; a plurality of Radio Frequency (RF) chains connected to the plurality of antenna subarrays; and a baseband to control the plurality of antenna subarrays to form a plurality of directional beams directed in a plurality of different directions for communicating a MIMO wireless transmission, and to process the MIMO wireless transmission according to a space-block coding scheme.

Example 12 includes the subject matter of Example 11 and optionally, wherein the baseband is to control the plurality of antenna subarrays to form the plurality of beams for receiving the MIMO wireless transmission, and to decode the MIMO wireless transmission according to the space-block coding scheme.

Example 13 includes the subject matter of Example 11 or 12 and optionally, wherein the baseband is to control the plurality of antenna subarrays to form the plurality of beams for transmitting the MIMO wireless transmission, and to encode the MIMO wireless transmission according to the space-block coding scheme.

Example 14 includes the subject matter of any one of Examples 11-13 and optionally, wherein the baseband is to select between the space-block coding scheme and an open-loop MIMO scheme for processing the MIMO wireless transmission.

Example 15 includes the subject matter of Example 14 and optionally, wherein the baseband is to select between the space-block coding scheme and the open-loop MIMO scheme based on a throughput criterion.

Example 16 includes the subject matter of any one of Examples 11-15 and optionally, wherein the space-block coding scheme comprises a space-time-block-coding (STBC) scheme.

Example 17 includes the subject matter of any one of Examples 11-15 and optionally, wherein the space-block coding scheme comprises a space-frequency-block-coding (SFBC) scheme.

Example 18 includes the subject matter of any one of Examples 11-17 and optionally, wherein the baseband is to modulate the wireless transmission according to a single-carrier modulation scheme.

Example 19 includes the subject matter of any one of Examples 11-17 and optionally, wherein the baseband is to modulate the wireless transmission according to a multi-carrier modulation scheme.

Example 20 includes the subject matter of any one of Examples 11-19 and optionally, wherein the MIMO wireless transmission comprises a transmission over a directional multi-gigabit (DMG) channel.

Example 21 includes a method of wireless communication, the method comprising controlling a plurality of antenna subarrays to form a plurality of directional beams directed in a plurality of different directions; and communicating via the plurality of directional beams a multi-input-multi-output (MIMO) wireless transmission, which is encoded according to a space-block coding scheme.

Example 22 includes the subject matter of Example 21 and optionally, wherein the communicating comprises receiving the MIMO wireless transmission via the plurality of directional beams, the method comprising decoding the MIMO wireless transmission according to the space-block coding scheme.

Example 23 includes the subject matter of Example 21 and optionally, wherein the communicating comprises transmitting the MIMO wireless transmission via the plurality of directional beams, the method comprising encoding the MIMO wireless transmission according to the space-block coding scheme.

Example 24 includes the subject matter of any one of Examples 21-23 and optionally, comprising selecting between the space-block coding scheme and an open-loop MIMO scheme for processing the MIMO wireless transmission.

Example 25 includes the subject matter of any one of Examples 21-23 and optionally, comprising selecting, based on a throughput criterion, between the space-block coding scheme and an open-loop MIMO scheme for processing the MIMO wireless transmission.

Example 26 includes the subject matter of any one of Examples 21-25 and optionally, wherein the space-block coding scheme comprises a space-time-block-coding (STBC) scheme.

Example 27 includes the subject matter of any one of Examples 21-25 and optionally, wherein the space-block coding scheme comprises a space-frequency-block-coding (SFBC) scheme.

Example 28 includes the subject matter of any one of Examples 21-27 and optionally, wherein the wireless transmission is modulated according to a single-carrier modulation scheme.

Example 29 includes the subject matter of any one of Examples 21-27 and optionally, wherein the wireless transmission is modulated according to a multi-carrier modulation scheme.

Example 30 includes the subject matter of any one of Examples 21-29 and optionally, wherein communicating the MIMO wireless transmission comprises communicating the MIMO wireless transmission over a directional multi-gigabit (DMG) channel.

Example 31 includes a product including a non-transitory storage medium having stored thereon instructions that, when executed by a machine, result in controlling a plurality of antenna subarrays to form a plurality of directional beams directed in a plurality of different directions; and communicating via the plurality of directional beams a multi-input-multi-output (MIMO) wireless transmission, which is encoded according to a space-block coding scheme.

Example 32 includes the subject matter of Example 31 and optionally, wherein the communicating comprises receiving the MIMO wireless transmission via the plurality of directional beams, the instructions resulting in decoding the MIMO wireless transmission according to the space-block coding scheme.

Example 33 includes the subject matter of Example 31 and optionally, wherein the communicating comprises transmitting the MIMO wireless transmission via the plurality of directional beams, the instructions resulting in encoding the MIMO wireless transmission according to the space-block coding scheme.

Example 34 includes the subject matter of any one of Examples 31-23 and optionally, wherein the instructions result in selecting between the space-block coding scheme and an open-loop MIMO scheme for processing the MIMO wireless transmission.

Example 35 includes the subject matter of Example 34 and optionally, wherein the selecting comprises selecting between the space-block coding scheme and the open-loop MIMO scheme based on a throughput criterion.

Example 36 includes the subject matter of any one of Examples 31-35 and optionally, wherein the space-block coding scheme comprises a space-time-block-coding (STBC) scheme.

Example 37 includes the subject matter of any one of Examples 31-35 and optionally, wherein the space-block coding scheme comprises a space-frequency-block-coding (SFBC) scheme.

Example 38 includes the subject matter of any one of Examples 31-37 and optionally, wherein the wireless transmission is modulated according to a single-carrier modulation scheme.

Example 39 includes the subject matter of any one of Examples 31-37 and optionally, wherein the wireless transmission is modulated according to a multi-carrier modulation scheme.

Example 40 includes the subject matter of any one of Examples 31-39 and optionally, wherein communicating the MIMO wireless transmission comprises communicating the MIMO wireless transmission over a directional multi-gigabit (DMG) channel.

Example 41 includes an apparatus of wireless communication, the apparatus including means for controlling a plurality of antenna subarrays to form a plurality of directional beams directed in a plurality of different directions; and means for communicating via the plurality of directional beams a multi-input-multi-output (MIMO) wireless transmission, which is encoded according to a space-block coding scheme.

Example 42 includes the subject matter of Example 41 and optionally, wherein the communicating comprises receiving the MIMO wireless transmission via the plurality of directional beams, the apparatus including means for decoding the MIMO wireless transmission according to the space-block coding scheme.

Example 43 includes the subject matter of Example 41 and optionally, wherein the communicating comprises transmitting the MIMO wireless transmission via the plurality of directional beams, the apparatus including means for encoding the MIMO wireless transmission according to the space-block coding scheme.

Example 44 includes the subject matter of any one of Examples 41-43 and optionally, comprising means for selecting between the space-block coding scheme and an open-loop MIMO scheme for processing the MIMO wireless transmission.

Example 45 includes the subject matter of Example 44 and optionally, wherein the means for selecting comprising means for selecting between the space-block coding scheme and the open-loop MIMO scheme based on a throughput criterion.

Example 46 includes the subject matter of any one of Examples 41-45 and optionally, wherein the space-block coding scheme comprises a space-time-block-coding (STBC) scheme.

Example 47 includes the subject matter of any one of Examples 41-45 and optionally, wherein the space-block coding scheme comprises a space-frequency-block-coding (SFBC) scheme.

Example 48 includes the subject matter of any one of Examples 41-47 and optionally, wherein the wireless transmission is modulated according to a single-carrier modulation scheme.

Example 49 includes the subject matter of any one of Examples 41-47 and optionally, wherein the wireless transmission is modulated according to a multi-carrier modulation scheme.

Example 50 includes the subject matter of any one of Examples 41-49 and optionally, wherein communicating the MIMO wireless transmission comprises communicating the MIMO wireless transmission over a directional multi-gigabit (DMG) channel.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a memory having stored thereon instructions; and
   a processor configured to execute the instructions to cause a wireless communication station (STA) to:
   encode a stream of data symbols into first and second encoded streams according to a Space-Time-Block-Code (STBC) encoding scheme by encoding a data symbol in the stream of data symbols into a pair of encoded data symbols to be included in the first and second encoded streams, respectively; and
   transmit a Multiple-Input-Multiple-Output (MIMO) transmission based on the first and second encoded streams by hybrid beamforming over a Directional Multi-Gigabit (DMG) channel, the hybrid beamforming comprising baseband beamforming and antenna beamforming of an antenna configuration.

2. The apparatus of claim 1 configured to cause the STA to encode a first data symbol in the stream of data symbols into a first pair of encoded symbols and to encode a second data symbol in the stream of data symbols into a second pair of encoded symbols, the second data symbol consecutive to the first data symbol, the first pair of encoded symbols comprising the first data symbol and a complex conjugate of the first data symbol, the second pair of encoded symbols comprising the second data symbol and a sign-inverted complex conjugate of the second data symbol.

3. The apparatus of claim 1 configured to cause the STA to modulate the MIMO transmission according to a Single Carrier (SC) modulation scheme.

4. The apparatus of claim 1 configured to cause the STA to modulate the MIMO transmission according to an Orthogonal Frequency Division Multiplexing (OFDM) modulation scheme.

5. The apparatus of claim 1 configured to cause the STA to transmit the MIMO transmission via a plurality of Radio Frequency (RF) chains.

6. The apparatus of claim 1 configured to cause the STA to control a plurality of antennas for the antenna beamforming.

7. The apparatus of claim 1, wherein the DMG channel comprises a channel in a frequency band above 40 Gigahertz (GHz).

8. The apparatus of claim 1 comprising a plurality of Radio Frequency (RF) chains to transmit the MIMO transmission.

9. The apparatus of claim 1 comprising a radio.

10. The apparatus of claim 1 comprising a plurality of antennas.

11. A product comprising one or more tangible computer-readable non-transitory storage media comprising computer-executable instructions operable to, when executed by at least one processor, enable the at least one processor to cause a wireless communication station (STA) to:
   encode a stream of data symbols into first and second encoded streams according to a Space-Time-Block-Code (STBC) encoding scheme by encoding a data symbol in the stream of data symbols into a pair of encoded data symbols to be included in the first and second encoded streams, respectively; and
   transmit a Multiple-Input-Multiple-Output (MIMO) transmission based on the first and second encoded streams by hybrid beamforming over a Directional Multi-Gigabit (DMG) channel, the hybrid beamforming comprising baseband beamforming and antenna beamforming of an antenna configuration.

12. The product of claim 11, wherein the instructions, when executed, cause the STA to encode a first data symbol in the stream of data symbols into a first pair of encoded symbols and to encode a second data symbol in the stream of data symbols into a second pair of encoded symbols, the second data symbol consecutive to the first data symbol, the first pair of encoded symbols comprising the first data symbol and a complex conjugate of the first data symbol, the second pair of encoded symbols comprising the second data symbol and a sign-inverted complex conjugate of the second data symbol.

13. The product of claim 11, wherein the instructions, when executed, cause the STA to modulate the MIMO transmission according to a Single Carrier (SC) modulation scheme.

14. The product of claim 11, wherein the instructions, when executed, cause the STA to modulate the MIMO transmission according to an Orthogonal Frequency Division Multiplexing (OFDM) modulation scheme.

15. The product of claim 11, wherein the instructions, when executed, cause the STA to transmit the MIMO transmission via a plurality of Radio Frequency (RF) chains.

16. The product of claim 11, wherein the instructions, when executed, cause the STA to control a plurality of antennas for the antenna beamforming.

17. The product of claim 11, wherein the DMG channel comprises a channel in a frequency band above 40 Gigahertz (GHz).

18. An apparatus comprising:
- means for causing a wireless communication station (STA) to encode a stream of data symbols into first and second encoded streams according to a Space-Time-Block-Code (STBC) encoding scheme by encoding a data symbol in the stream of data symbols into a pair of encoded data symbols to be included in the first and second encoded streams, respectively; and
- means for causing the STA to transmit a Multiple-Input-Multiple-Output (MIMO) transmission based on the first and second encoded streams by hybrid beamforming over a Directional Multi-Gigabit (DMG) channel, the hybrid beamforming comprising baseband beamforming and antenna beamforming of an antenna configuration.

19. The apparatus of claim 18 comprising means for causing the STA to encode a first data symbol in the stream of data symbols into a first pair of encoded symbols and to encode a second data symbol in the stream of data symbols into a second pair of encoded symbols, the second data symbol consecutive to the first data symbol, the first pair of encoded symbols comprising the first data symbol and a complex conjugate of the first data symbol, the second pair of encoded symbols comprising the second data symbol and a sign-inverted complex conjugate of the second data symbol.

20. The apparatus of claim 18 comprising means for causing the STA to modulate the MIMO transmission according to a Single Carrier (SC) modulation scheme.

* * * * *